US008594080B2

(12) United States Patent
Fleming et al.

(10) Patent No.: US 8,594,080 B2
(45) Date of Patent: Nov. 26, 2013

(54) MULTIPLE FUNCTIONALITY IN A VIRTUAL STORAGE AREA NETWORK DEVICE

(75) Inventors: Mark Sean Fleming, Tucson, AZ (US); Hemanth Kalluri, San Jose, CA (US); Jeffry Lynn Larson, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 12/916,366

(22) Filed: Oct. 29, 2010

(65) Prior Publication Data

US 2012/0110385 A1 May 3, 2012

(51) Int. Cl.
*H04L 12/28* (2006.01)
*H04L 12/54* (2013.01)
*G06F 15/16* (2006.01)
*G06F 15/173* (2006.01)
*G06F 3/00* (2006.01)

(52) U.S. Cl.
USPC ........... 370/355; 370/392; 370/397; 370/409; 370/428; 370/469; 709/220; 709/223; 709/230; 709/250; 710/36; 711/203

(58) Field of Classification Search
USPC ................. 370/355, 392, 397, 409, 428, 469; 709/220, 223, 230, 250; 710/36; 711/203
See application file for complete search history.

(56) References Cited

U.S. PATENT DOCUMENTS

| | | | | |
|---|---|---|---|---|
| 6,839,746 B1 * | 1/2005 | Muthiyan et al. | ............ | 709/220 |
| 7,206,863 B1 * | 4/2007 | Oliveira et al. | ............... | 709/245 |
| 7,426,212 B2 * | 9/2008 | Someya et al. | ............... | 370/401 |
| 7,499,410 B2 * | 3/2009 | Dutt et al. | ...................... | 370/254 |
| 7,584,341 B2 * | 9/2009 | Gal-Oz | .......................... | 711/202 |
| 7,643,468 B1 | 1/2010 | Arregoces et al. | | |
| 7,656,812 B2 | 2/2010 | Tadimeti et al. | | |
| 7,669,000 B2 | 2/2010 | Sharma et al. | | |
| 7,685,261 B1 * | 3/2010 | Marinelli et al. | ............. | 709/220 |
| 7,870,220 B1 * | 1/2011 | Panelli et al. | .................. | 709/216 |
| 7,876,711 B2 * | 1/2011 | Dutt et al. | ..................... | 370/254 |
| 7,912,087 B2 * | 3/2011 | Tsukishima et al. | .......... | 370/468 |
| 7,916,628 B2 * | 3/2011 | Ghosh et al. | .................. | 370/218 |
| 7,930,448 B2 * | 4/2011 | Chaitanya et al. | ............. | 710/38 |
| 8,036,229 B2 * | 10/2011 | Banerjee | ........................ | 370/397 |
| 2004/0153854 A1 | 8/2004 | Agrawal et al. | | |
| 2004/0215749 A1 * | 10/2004 | Tsao | ............................ | 709/220 |

(Continued)

OTHER PUBLICATIONS

"VSAN", Wikipedia, (online), Jul. 10, 2010., Retrieved from the Internet at URL://http://en.wikipedia.org/wiki/VSAN, 1 pg.
"Fibre Channel", Wikipedia, (online), Oct. 1, 2010. Retrieved from the internet at URL://http://en.wikipedia.orgiwiki/Fibre_Channel, 8 pgs.

(Continued)

*Primary Examiner* — Alpus H Hsu
(74) *Attorney, Agent, or Firm* — William Konrad; Konrad, Raynes, Davda and Victor LLP

(57) ABSTRACT

In one aspect of the present description, a connection between a predetermined input port and a predetermined output port is created in a partition of a VSAN switch, in which the connection is a destination address independent physical layer connection conforming to the physical layer of a communication protocol. Another connection between a plurality of input ports and a plurality of output ports may be created in another partition of the VSAN switch, in which the connection is a multi-layer connection which includes a network layer connection conforming to the network layer of the communication protocol. Other features and aspects may be realized, depending upon the particular application.

21 Claims, 3 Drawing Sheets

(56) References Cited

U.S. PATENT DOCUMENTS

| | | |
|---|---|---|
| 2005/0025075 A1* | 2/2005 | Dutt et al. ............... 370/299 |
| 2005/0094568 A1 | 5/2005 | Judd |
| 2005/0094630 A1 | 5/2005 | Valdevit |
| 2007/0239944 A1 | 10/2007 | Rupanagunta et al. |
| 2008/0115144 A1* | 5/2008 | Tsao ............... 718/105 |
| 2009/0100163 A1* | 4/2009 | Tsao ............... 709/223 |
| 2009/0103566 A1 | 4/2009 | Kloth et al. |
| 2010/0002588 A1 | 1/2010 | Cantwell et al. |
| 2010/0034100 A1 | 2/2010 | Beyers |
| 2011/0010427 A1* | 1/2011 | Jnagal et al. ............... 709/213 |
| 2011/0090816 A1* | 4/2011 | Dutt et al. ............... 370/254 |
| 2011/0128848 A1* | 6/2011 | Tsukishima et al. ......... 370/231 |

OTHER PUBLICATIONS

"Fibre Channel Switch", Wikipedia, (online), Dec. 17, 2009., Retrieved from the Internet at URL://http:www.en.wikipedia.org/wiki/Fibre_Channel_switch, 1 pg.

"Network Switch", Wikipedia, (online), Oct. 27, 2010., Retrieved from the Internet at URL://http:www.en.wikipedia.org/wiki/Network_switch, 6 pgs.

"OSI Model", Wikipedia, (online), Aug. 16, 2010., Retrieved from the Internet at URL://http:www.en.wikipedia.org/wiki/OSI_Model, 9 pgs.

"Storage Area Network", Wikipedia, (online), Oct. 29, 2010., Retrieved from the Internet at URL://http:www.en.wikipedia.org/wiki/Storage_area_network, 5 pgs.

* cited by examiner

MULTIPLE FUNCTIONALITY IN A VIRTUAL STORAGE AREA NETWORK DEVICE

BACKGROUND

1. Field

The present description relates to a method, system, and computer program for switching data in a communication fabric in a storage area network.

2. Description of Related Art

A storage area network (SAN) is frequently used to couple remote computer storage devices such as disk arrays, tape libraries, optical jukeboxes or other storage devices, to hosts in a manner which permits the storage devices to appear to the operating systems of the hosts as locally attached to the hosts. Fibre Channel (FC) is a high speed networking technology in which signals may be transmitted over various transmission media including fiber optic cable or twisted pair copper cables, for example.

In a Fibre Channel SAN, devices may be connected together in various topologies. For example, in Point-to-Point topology, devices may be connected directly together. In an Arbitrated Loop topology, devices may be connected in a loop or ring. In a switched fabric topology, the devices or loops of devices may be connected through Fibre Channel switches.

A Fibre Channel switch is a network switch compatible with the Fibre Channel protocol. A network switch is a computer networking device that connects together segments of a network. A network switch typically processes and routes data at protocol layers which includes at least the data link layer (layer 2 of the Open Systems Interconnection (OSI) model or layer FC1 of the Fibre Channel model, for example). Network switches that additionally process data at the network layer (layer 3 of the OSI model or layer FC2 of the Fibre Channel model, for example) and above are often referred to as multilayer switches.

A Fibre Channel switch allows the creation of a Fibre Channel fabric which is often a major component of many storage area networks. A Fibre Channel fabric typically includes a network of Fibre Channel devices, which allows many-to-many communication. Other features such as device name lookup, security, and redundancy are also often provided by such a network. Fibre Channel switches can implement "zoning" to disable unwanted traffic between certain fabric nodes.

A virtual storage area network (VSAN) is typically a collection of ports from a set of connected Fibre Channel switches, that form a virtual fabric. A port in Fibre Channel terminology is generally any entity that actively communicates over the network, and is not necessarily a hardware port. Such a port is usually implemented in a device such as disk storage, a device adapter on storage, a host bus adapter (HBA) on a server or a Fibre Channel switch. Multiple pairs of ports typically may communicate simultaneously in a fabric.

The use of VSANs allows traffic to be isolated within specific portions of the network. Thus, if a problem should occur in one VSAN, that problem can often be handled with a minimum of disruption to the rest of the network. VSANs usually can be configured separately and independently, as well.

Ports within a single Fibre Channel switch often can be partitioned into multiple VSANs, which can share hardware resources including hardware ports. Conversely, multiple switches typically can join a number of ports to form a single VSAN.

A VSAN, like each FC fabric, may offer different high-level protocols such as FCP (Fibre Channel Protocol), FCIP (Fibre Channel over Internet Protocol), FICON (Fiber Connection), and iSCSI (Internet Small Computer Systems Interface or Small Computer Systems Interface over TCP/IP (Transmission Control Protocol/Internet Protocol)), for example. Each VSAN may be a separate self-contained fabric having different features such as distinctive security policies, zones, events, memberships, and name services, for example. Traffic may also be separate in the different VSANs. Unlike a typical fabric that is resized switch-by-switch, a VSAN often may be resized port-by-port.

In addition to multi-layer switches such as a VSAN, a fabric may also include physical layer switches which provide user-configurable dedicated communication paths between respective ports. The physical layer refers to Layer 1 of the OSI or layer FC0 of the Fibre Channel model, for example. An example of a physical layer switch is an APCON "Intellapatch" physical switch.

A fabric may also include a debug device which performs trace capture and analysis, for example. Such a debug device is typically inserted at various points of the SAN to collect traffic samples. The Finisar "Xgig" device is an example of a debug device for storage area networks.

SUMMARY

In one aspect of the present description, a connection between a predetermined input port and a predetermined output port is created in a partition of a VSAN switch, in which the connection is a destination address independent physical layer connection conforming to the physical layer of a communication protocol. Another connection between a plurality of input ports and a plurality of output ports may be created in another partition of the VSAN switch, in which the connection is a multi-layer connection which includes a network layer connection conforming to the network layer of the communication protocol.

Data may be forwarded through the physical layer connection of the VSAN partition in accordance with the physical layer of the communication protocol. In one aspect, data bits of data packets received at the predetermined input port of the physical layer connection of the partition, may be forwarded to the predetermined output port of the physical layer connection of the partition, independently of any destination address within each data packet.

In another aspect, data may be forwarded through the multi-layer connection of a partition of the VSAN in accordance with the network layer of the communication protocol. For example, data packets received at one of the input ports of the multi-layer connection of a partition, may be forwarded to one of the output ports of the multi-layer connection of the partition, as determined by a destination address within each data packet.

In another aspect, the predetermined output port of the physical layer connection of one partition, and an input port of the multi-layer connection of another partition, may be a shared port shared by the physical layer connection of a partition and the multi-layer connection of a partition. In one result, data bits of data packets forwarded through the physical layer connection of a partition, to the predetermined output port of the physical layer connection of a partition, may be received at the input port of the multi-layer connection of a partition, which is shared with the predetermined output port of the physical layer connection of a partition.

In yet another aspect, the predetermined input port of the physical layer connection of a partition, and an output port of the multi-layer connection of a partition, may be a shared port shared by the physical layer connection of a partition and the multi-layer connection of a partition. In one result, data bits of data packets forwarded through the physical layer connection of a partition, to the predetermined output port of the physical layer connection of a partition, are received from an output port of the multi-layer connection of a partition, which is shared with the predetermined input port of the physical layer connection of a partition.

In still another aspect, a partition of the VSAN switch may be reconfigured from a physical layer connection conforming to the physical layer protocol of the communication protocol, to a multi-layer connection which includes a network layer conforming to the network layer protocol of the communication protocol.

In another aspect, a partition of the VSAN switch may be reconfigured from a multi-layer connection which includes a network layer conforming to the network layer of the communication protocol, to a physical layer connection conforming to the physical layer protocol of the communication protocol.

In still another aspect, a debug monitor may be created in a VSAN partition to collect and analyze data on the forwarding of data bits though the physical layer connection of the partition to detect errors.

In still another aspect, a debug monitor may be created in a VSAN partition to collect and analyze data on the forwarding of data packets though the multi-layer connection of the partition to detect errors.

Other features and aspects may be realized, depending upon the particular application.

DETAILED DESCRIPTION

Figure 1:
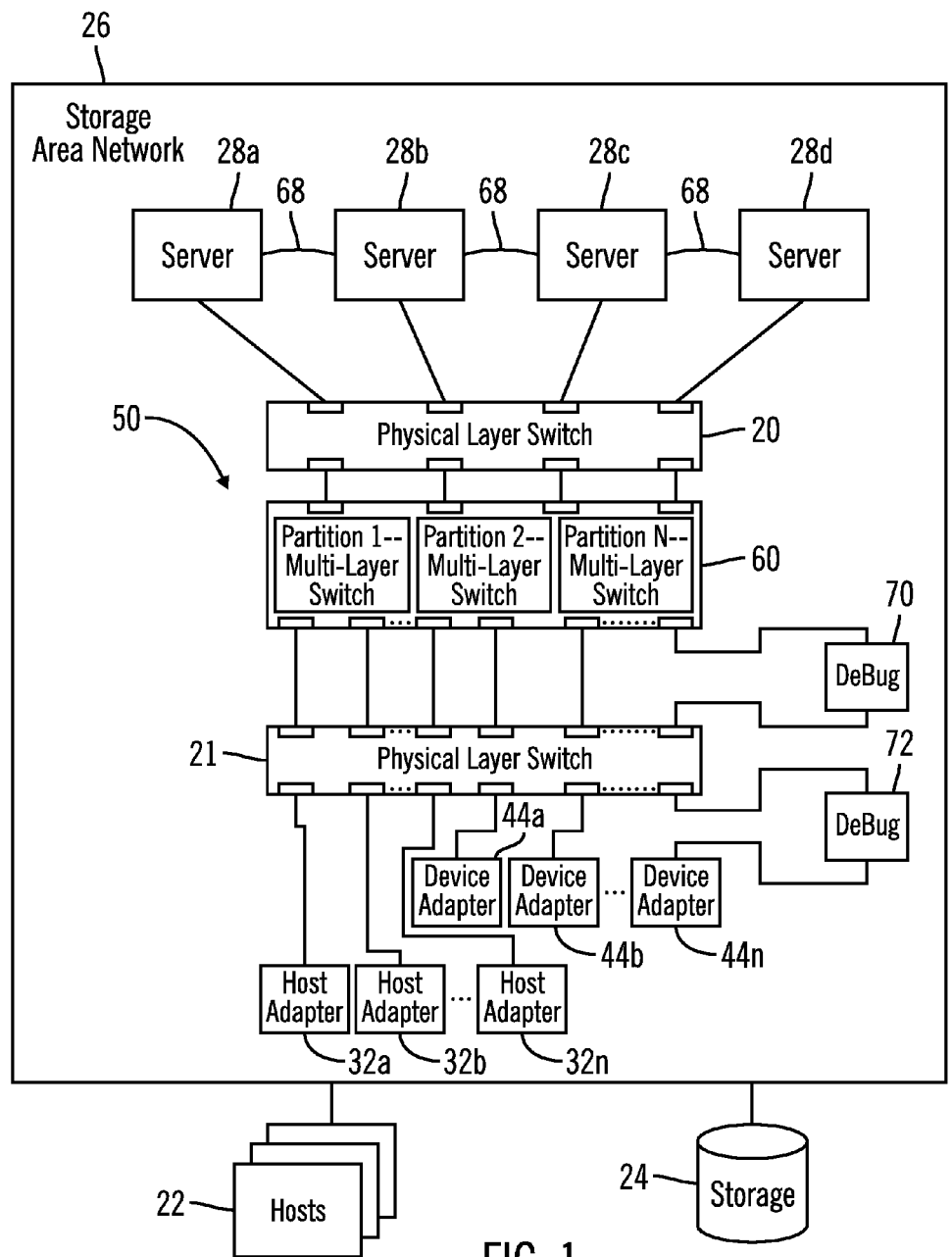
FIG. 1 illustrates a prior storage area network employing a partitionable multi-layer switch and separate, dedicated physical layer switches and debug devices.

FIG. 1 illustrates one example of a known computing environment employing separate, dedicated physical layer switches 20, 21. One or more hosts 22 communicate Input/Output (I/O) tasks or other processing requests directed to a storage 24, through a storage area network 26 which manages access to the storage 24. In one embodiment, the storage area network 26 includes a plurality of servers 28a, 28b, 28c, 28d, each including a processor and a memory. Each processor can include one or more central processing units (CPUs) available as processing resources to the associated server 28a-28d. Although the storage area network 26 is depicted as including four servers 28a-28d, for purposes of illustration, it is appreciated that the number of servers may be greater or lesser, depending upon the particular application.

Each server 28a-28d may have one or more logical partitions executing in the server 28a-28d. Each logical partition separately executes an operating system and device drivers. The logical partitions comprise a division of the processors into logically independent but cooperating processing systems each having their own operating systems and device drivers. Multiple logical partitions may execute in each server 28a-28d, managed by a supervisor module for that server 28a-28d.

Each device driver provides an interface between the operating system in the logical partition in which the device driver executes, and a device, such as an I/O adapter including host adapters 32a, 32b . . . 32n, and device adapters 44a, 44b . . . 44n. The host adapters 32a, 32b . . . 32n, enable the servers 28a-28d to communicate with the hosts 22. The device adapters 44a, 44b . . . 44n enable the servers 28a-28d to communicate with the storage 24. Thus, the servers 28a-28d share devices, such as adapters 32a, 32b . . . 32n, 44a, 44b . . . 44n. The variable "n" is used to denote an integer instance of an element, and may indicate different or the same integer value when used with different elements. For instance, 32n, 44n, may indicate a same or different number of host adapters 32n, and device adapters 44n.

The servers 28a-28d communicate with the host adapters 32a, 32b . . . 32n, and the device adapters 44a, 44b . . . 44n, over a fabric 50. The fabric 50 may comprise one or more interfaces providing communication paths between the servers 28a-28d and adapters. A path comprises the hardware in the fabric 50 that enables communication with shared adapters over the fabric. The fabric may comprise for example, a Fibre Channel arbitrated loop configuration, a serial loop architecture or a bus interface, such as a Peripheral Component Interconnect (PCI) interface such as a PCI-Express interface. Each server 28a-28d may be assigned a portion of the adapters 32a, 32b . . . 32n, 44a, 44b . . . 44n during initialization.

In the example of FIG. 1, the fabric 50 includes a VSAN multi-layer switch 60 which may be partitioned into a plurality of partitions 1, 2, . . . n, each partition functioning as a virtual multi-layer switch. The multi-layer switch 60 facilitates sharing of the adapters 32a, 32b . . . 32n, 44a, 44b . . . 44n by each of the servers 28a-28d.

The servers 28a-28d may be assigned to handle I/O requests directed to specific volumes configured in the storage 24. The servers 28a-28d communicate with the storage 24, via the device adapters 44a, 44b . . . 44n over a device network (not shown), which may comprise a local area network (LAN), storage area network (SAN), bus interface, serial interface, etc. The servers 28a-28d communicate over connections 68 enabling processor inter-communication to manage configuring operations performed with respect to the shared devices, such as the shared adapters 32a, 32b . . . 32n, 44a, 44b . . . 44n. In various examples, there may be several fabrics connecting adapters 32a, 32b . . . 32n, 44a, 44b . . . 44n.

A storage area network may have multiple servers often referred to as a cluster of servers, which receive input/output requests from one or more hosts, to perform input/output operations in which data is read from or written to storage through various I/O adapters. Each cluster may have one or more central processing units (CPUs) in which the processing and memory resources of the cluster may be apportioned into logical partitions, each of which is capable of running an operating system and performing the functions of a "server". Thus, as used herein, the term "server" may be used to refer to a physical server or a logical partition performing a server function.

A server may have multiple I/O adapters including host and device adapters which are accessed through a switch such as the VSAN switch 60. To increase efficiency or availability or both, it is often desirable to share I/O adapters amongst the servers of the cluster. Thus, a device adapter, for example, may be shared as a "virtual" device adapter. As previously mentioned, the servers typically communicate with the device adapters and other I/O adapters over the fabric 50 which may comprise one or more interfaces providing communication paths between the servers and adapters.

Each Partition 1, 2 . . . n of the VSAN switch 60 typically includes routing logic which logically couples a selected upstream port of the switch 60 to a selected downstream port of the switch 60. In this manner, a particular server coupled to an upstream port, may be logically coupled to a particular device adapter coupled to a downstream port, for the purpose of conducting I/O operations between that server and storage via the device adapter. Similarly, a particular server coupled to an upstream port, may be logically coupled to a particular host coupled to a downstream port, for the purpose of conducting I/O operations between that server and host via the host adapter. Thus, each server may be logically coupled to each I/O adapter of the shared adapters via the switch.

Each Partition 1, 2 . . . N of the VSAN switch 60 typically further includes error reporting logic. In the course of an I/O operation, an error may be detected by the Partition 1, 2 . . . N of the VSAN switch 60 on one or more of the shared I/O or host adapters. Each Partition 1, 2 . . . N of the VSAN switch 60 may be configured or programmed to report the occurrence of an error to one of the servers.

Various types of errors may occur in an I/O adapter such as a device adapter. For example, many communication systems employ a periodic cyclic redundancy check (CRC) to detect alteration of data being communicated. Thus, I/O transactions to a device adapter may have CRC errors, may be malformed, poisoned, timed out, aborted, unexpected, unsupported, etc. In a fabric, in response to a detected error, details of the transaction in which the error arose may be logged in one or more error reporting registers. In some applications, a generic error message may be sent to a server by the switch 60 via an upstream port.

Hence, each of the servers 28a, 28b . . . 28n may access each of the initialized I/O adapters via a partition of the switch 60 to conduct I/O operations. Conversely, each of the I/O and host adapters may access each of the servers to conduct I/O operations such as direct memory access (DMA) operations.

Modern day Storage Area Networks (SANs) as represented by the simplified drawing of FIG. 1 frequently become immensely complex, utilizing multiple components to accomplish important activities. In addition to the general functionality of a VSAN multi-layer switch, many storage area networks utilize other devices for controlling, inventorying, and debugging SANs. These tasks are often done while integrating new components into, or scheduled testing of the existing components of, the SAN.

For example, physical layer switches such as the physical layer switches 20, 21 are often utilized to create, modify or disconnect connections between different components in the SAN 26 without manual, physical intervention. The functions of the physical layer switches are typically dedicated and thus limited to the creation, modification and disconnection of connections.

The SAN 26 may also include a dedicated SAN debug device 70, 72 which performs trace capture and analysis. Such a debug device is typically inserted at various points of the SAN to collect traffic samples. For example, FIG. 1 shows a debug device 70 inserted between the VSAN multi-layer switch 60 and the physical layer switch 21. A second debug device may be inserted between the physical layer switch 21 and a device adapter 44n, for example. Some physical layer switches may have a data monitoring function built in.

Figure 2:
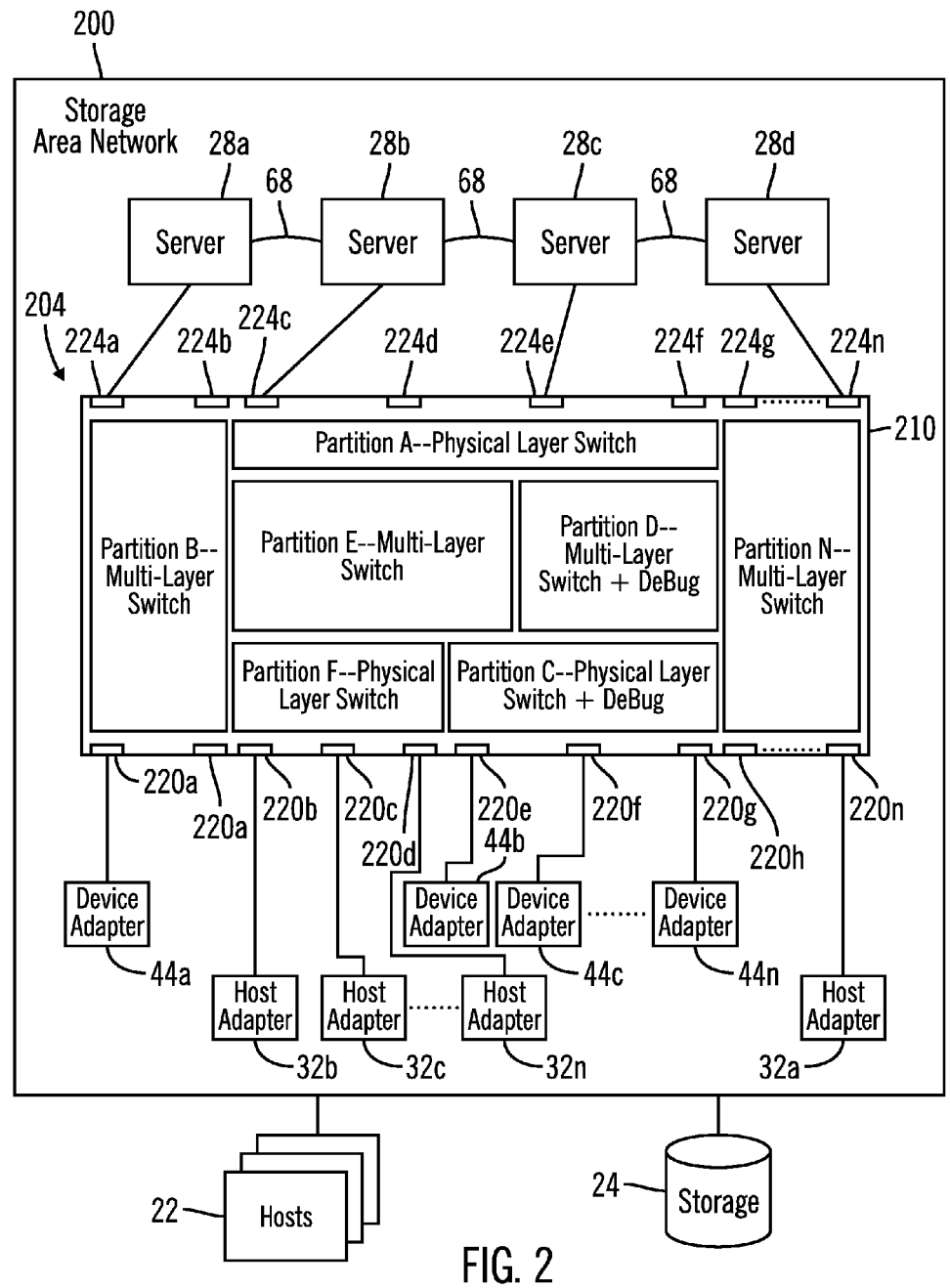
FIG. 2 illustrates an embodiment of a computing environment in which an aspect of the present description may be employed.

FIG. 2 illustrates one example of a computing environment employing an aspect of the present description. Like the computing environment depicted in FIG. 1, one or more hosts 22 communicate Input/Output (I/O) tasks or other processing requests directed to a storage 24, through a storage area network 200 which manages access to the storage 24. In one aspect of the present description, the storage area network 200 includes a fabric 204 having a virtual storage area network (VSAN) switch 210 which can reduce or eliminate the need for physical layer switches such as the physical layer switches 20, 21 employed in the storage area network 26 of FIG. 1.

As explained in greater detail below, selected partitions of the VSAN switch 210 may be configured to provide the functionality of a physical layer switch, thus obviating use of a separate, dedicated physical layer switch device such as the physical layer switches 20, 21 (FIG. 1) It is believed that prior VSAN switches such as the VSAN switch 60 of FIG. 1 typically provide substantially the same functionality to all partitions 1, 2 . . . n of the VSAN switch 60. The minimum functionality of each partition partitions 1, 2 . . . n of the VSAN switch 60 is believed to be that of a multi-layer switch which processes data at the network layer (e.g. FC2 in the FC model, or layer 3 in the OSI model) and above.

In accordance with the present description, the functionality provided to the partitions A, B, C . . . N of the VSAN switch 210 may be altered such that the functionality of one partition differs significantly from that of another. For example, the functionality of Partition A of the VSAN switch 210 may be "dumbed down" relative to that of a full function partition such as Partition B, for example, which functions as a multi-layer switch. More specifically, the Partition A may be configured to function as a physical layer switch which provides user-configurable, address-independent communication paths among respective ports 220a, 220b . . . 220n and 224a, 224b . . . 224n in accordance with the physical layer FC0 of the FC model, for example. By comparison, Partition B may be configured to function as a multi-layer switch to process data at the network layer (FC2 in the FC model) and above. Thus, by adding a partition to the VSAN switch 210 and configuring the added partition as a physical layer switch, a separate, dedicated physical layer switch device external to the VSAN switch 210 may be eliminated.

In another aspect of the present description, the functionality provided to the partitions A, B, C . . . N of the VSAN switch 210 may be further altered. For example, Partition C of the VSAN switch 210 may be configured to function not only as a physical layer switch which provides user-configurable, address-independent communication paths between respective ports 220a, 220b . . . 220n and 224a, 224b . . . 224n in accordance with the physical layer FC0 in the FC model, but also provides a debug function to perform trace capture and analysis within the Partition C.

As another example, Partition D of the VSAN switch 210 may be configured to function not only as a multi-layer switch to process data at the network layer (FC2 in the FC model) and above, but also to provide a debug function to perform trace capture and analysis within the Partition D. It is appreciated that other functionalities may be configured into one or more of the partitions of the VSAN switch 210, depending upon the particular application.

The servers 28a-28d communicate with the host adapters 32a, 32b . . . 32n, and the device adapters 44a, 44b . . . 44n, over the fabric 204 which may comprise one or more interfaces providing communication paths between the servers 28a-28d and adapters. The fabric 204 may comprise for example, a Fibre Channel arbitrated loop configuration, a serial loop architecture or other devices. Various devices such as a bus interface (for example a PCI-E (Peripheral Component Interconnect-Express interface) may be used to connect to a fabric such as the fabric 204. Each server 28a-28d may be assigned a portion of the adapters 32a, 32b . . . 32n, 44a, 44b . . . 44n during initialization.

As previously mentioned, in the embodiment of FIG. 2, the fabric 204 includes the VSAN multi-functional switch 210 which may be partitioned into a plurality of partitions A, B, . . . N, each partition capable of functioning as a different type of virtual switch. The VSAN multi-functional switch 210 facilitates sharing of the adapters 32a, 32b . . . 32n, 44a, 44b . . . 44n by each of the servers 28a-28d.

The servers 28a-28d may be assigned to handle I/O requests directed to specific volumes configured in the storage 24. The servers 28a-28d communicate with the storage 24, via the device adapters 44a, 44b . . . 44n over a device network (not shown), which may comprise a local area network (LAN), storage area network (SAN), bus interface, serial interface, etc.

In functioning as a physical layer switch, Partition A of the VSAN switch 210 switches bits of data frames or packets received at one of the ports 220a, 220b, . . . 220n, 224a, 224b, . . . 224n, to another port of the ports 220a, 220b, . . . 220n, 224a, 224b, . . . 224n, for transmission to a corresponding destination device or devices. As a physical layer switch, the Partition A provides user-configurable address, independent communication paths between respective ports 220a, 220b, . . . 220n, 224a, 224b, . . . 224n (e.g., between an "input port" and one or more "output ports.")

In the Fibre Channel model, the physical layer (FC0) is directed to transmission media such as cables and connectors and provides for establishment and termination of a connection to a transmission medium, such as a copper or optical cable for example. It is appreciated that a partition of a multi-layer switch may be configured to function as a physical layer switch instead of a multi-layer switch in accordance with protocols other than Fibre Channel. For example, a partition may be configured to function as a physical layer switch in accordance with layer 1, the physical layer of the OSI model. Other protocols having physical layers may be implemented as well, depending upon the particular application.

A Physical Layer of a communication protocol typically defines the electrical and physical connection specifications such as the layout of pins, voltages, cable specifications, hubs, repeaters, network adapters, host bus adapters (HBAs used in storage area networks) and more. The Physical Layer is typically concerned primarily with the interaction of a single device with a medium. For example, in a manual patch panel, a physical wire or cable may be physically connected or disconnected to control access to a medium such as a copper wire or an optical cable. In an electronic patch panel, electronic switches may be turned on or off to control access to a medium such as a copper wire or an optical cable. Thus, Partition A, for example, may be configured to function as a physical layer switch which provides a user-configurable electronic patch panel which provides dedicated communication paths among respective ports 220a, 220b . . . 220n and 224a, 224b . . . 224n in accordance with the physical Layer FC0 of the FC model, for example. Such an electronic patch panel may be effectively emulated by forwarding packets to an assigned output port of the physical layer connection by effectively ignoring address data embedded in the packets. It is appreciated that such an electronic patch panel function may be effectively provided utilizing other techniques in a partition of a VSAN switch, depending upon the particular application.

In contrast, the higher level layers of a communication protocol such as the Data Link and network layers are typically directed to interactions of multiple devices with a shared medium. Thus, in the example of FIG. 2, Partition B may be configured to function as a multi-layer switch to process data at the network layer (FC2 in the FC model) and above. In this example, the shared medium is the multi-layer connection provided by the Partition B. Multiple devices may transmit data in the form of packets or frames over the multi-layer connection of Partition B to multiple devices. The multi-layer connection of Partition B identifies the appropriate output port by examining the destination address data embedded in the packets or frames being transmitted.

Each multi-layer partition of the VSAN switch 210 may include routing logic which logically couples a selected upstream port of the switch 210 to a selected downstream port of the switch 210, in a manner similar to the multi-layer partitions of the VSAN switch 60. In this manner, a particular server coupled to an upstream port, may be logically coupled to a particular device adapter coupled to a downstream port, for the purpose of conducting I/O operations between that server and storage via the device adapter. Similarly, a particular server coupled to an upstream port, may be logically coupled to a particular host coupled to a downstream port, for the purpose of conducting I/O operations between that server and host via the host adapter. Thus, each server may be logically coupled to each I/O adapter of the shared adapters via the switch.

Each physical layer partition of the VSAN switch 210 may includes transistor switches which electrically couples a selected upstream port of the switch 210 to a selected downstream port of the switch 210 in a dedicated electrical path which continues until the user reconfigures the physical layer switch. Alternatively, such a physical layer switch may be effectively emulated by forwarding packets to an assigned output port of the physical layer connection by effectively ignoring any address data embedded in the packets. It is appreciated that such a physical layer switch function may be provided utilizing other techniques in a partition of a VSAN switch, depending upon the particular application.

In this manner, a particular server coupled to an upstream port, may be logically or physically coupled to a particular device adapter coupled to a downstream port, for the purpose of conducting I/O operations between that server and storage via the device adapter. Similarly, a particular server coupled to an upstream port, may be logically or physically coupled to a particular host coupled to a downstream port, for the purpose of conducting I/O operations between that server and host via the host adapter. Thus, each server may be logically coupled to each I/O adapter of the shared adapters via the switch 210.

Each Partition A, B . . . N of the VSAN switch 210 may also further include error reporting logic. In the course of an I/O operation, an error may be detected by the Partition A, B . . . N of the VSAN switch 210 on one or more of the shared I/O or host adapters. Each Partition A, B . . . N of the VSAN switch may be configured or programmed to report the occurrence of an error to one of the servers.

Hence, each of the servers 28a, 28b . . . 28n may access each of the initialized I/O adapters via a partition of the switch 210 to conduct I/O operations. Conversely, each of the I/O and host adapters may access each of the servers via a partition of the switch 210, to conduct I/O operations such as direct memory access (DMA) operations.

Figure 3:
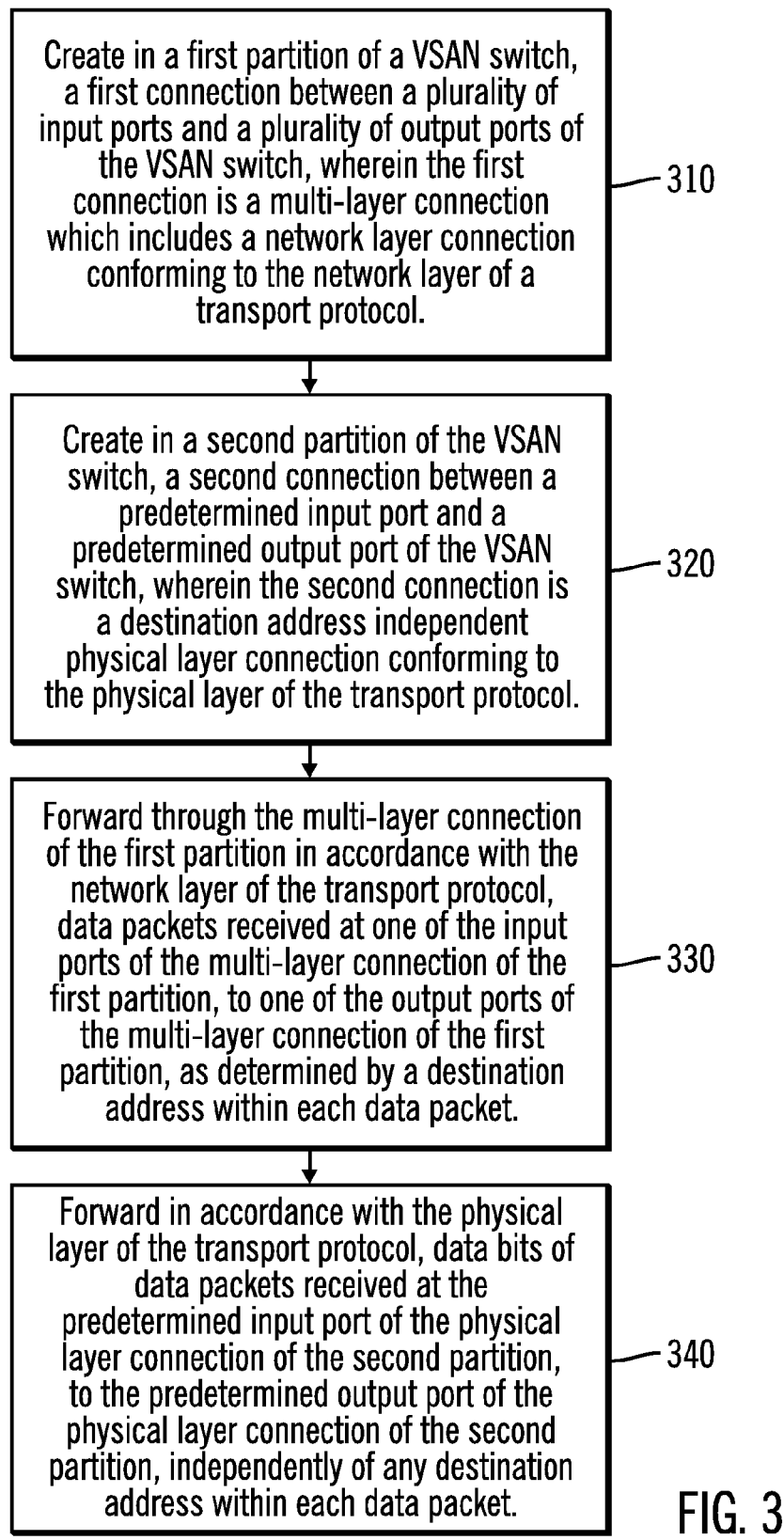
FIG. 3 depicts an example of operations for configuring VSAN partitions and forwarding data through the VSAN partitions in accordance with one embodiment of the present description.

FIG. 3 depicts one example of operations of a storage area network in accordance with one embodiment of the present description. In one operation, a first connection is created (block 310) in a first partition of a VSAN switch wherein the first connection is a multi-layer connection which includes a network layer connection conforming to the network layer of the communication protocol. In the illustrated embodiment, a user at an external computer may configure the VSAN switch 210 (FIG. 2) via a control port to create and configure a plurality of partitions including a Partition B as shown. It is appreciated that the VSAN switch 210 may be configured using a variety of techniques including automatic programmed configuration.

During configuration, selected input and output ports of the ports 220a, 220b . . . 220n and 224a, 224b . . . 224n are assigned to the various partitions including Partition B. The assignments need not be exclusive to the various partitions. Thus, selected input and output ports of the ports 220a, 220b . . . 220n and 224a, 224b . . . 224n may be shared by the various partitions A, B, . . . N being created.

In the illustrated embodiment, Partition B is configured to function as a multi-layer switch to process data at the network layer (FC2 in the FC model) and above. Thus, the Partition B is configured to provide a multi-layer connection which includes a network layer connection conforming to the network layer FC2 of the FC model.

In another operation, a second connection is created (block 320, FIG. 3) in another partition of the VSAN switch wherein the second connection is a destination address independent physical layer connection conforming to the physical layer of the communication protocol. Here too, selected input and output ports of the ports 220a, 220b . . . 220n and 224a, 224b . . . 224n are assigned to the various partitions including Partition A, and the assignments to Partition A need not be exclusive to Partition A. Thus, selected input and output ports of the ports 220a, 220b . . . 220n and 224a, 224b . . . 224n assigned to Partition A may be shared by the various other partitions B, . . . N being created.

In the illustrated embodiment, Partition A is configured to function as a physical layer switch to transmit data at the physical layer (FC0 in the FC model). Thus, the Partition A is configured to provide a physical layer connection conforming to the physical layer FC0 of the FC model.

In another operation, the multi-layer connection of the first partition in accordance with the network layer of the communication protocol, forwards (block 330, FIG. 3) data packets received at one of the input ports of the multi-layer connection of the first partition, to one of the output ports of the multi-layer connection of the first partition, as determined by a destination address within each data packet. For example, the multi-layer connection of Partition B may include a routing table associated with each port assigned the Partition B. Each data packet or frame that arrives at a port of the Partition N can identify a destination location (sometimes referred to as a Destination ID or DID). The routing table can provide one or more possible exit ports assigned the Partition B for routing the frame to the destination location. In one embodiment, a protocol implemented on multi-layer switch partition of the VSAN 210, may determine one or more shortest paths to any destination in the storage area network 200.

A "frame" is typically a digital data transmission unit or data packet that includes frame synchronization, i.e. a sequence of bits or symbols making it possible for the receiver to detect the beginning and end of the packet in the stream of symbols or bits. In the OSI model, a frame is a data packet on the Layer 2 of the OSI model. Thus in the OSI model, a frame is the unit of transmission in a link layer protocol, and consists of a link-layer header followed by a packet. If a multi-layer receiver is connected to the system in the middle of a frame transmission, it may ignore the data until it detects a new frame synchronization sequence.

In contrast, a physical layer connection typically does not recognize frames and transmits data on a bit level. However, it is appreciated that a physical layer connection may be effectively provided by a VSAN partition in accordance with the present description by forwarding the bits of frames through the physical layer in accordance with the physical layer protocol.

In another operation, data bits of data packets received at the predetermined input port of the physical layer connection of the second partition, forwards (block 340, FIG. 3) to the predetermined output port (or ports) of the physical layer connection of the second partition, independently of any destination address within each data packet. For example, once the physical layer connection of Partition A has been created, data received at an input port assigned to that physical layer connection is automatically directed to the corresponding output port(s) assigned to that physical layer connection. In contrast to the multi-layer connection of Partition B, the physical layer connection of Partition A need not examine the destination address data embedded in the packets or frames being transmitted to identify the appropriate output port, since the data received at an input port assigned to that physical layer connection of Partition A is automatically directed to the corresponding output port(s) assigned to that physical layer connection.

Moreover, the physical layer connection may be programmed to persist until the user subsequently reconfigures the physical layer switch of Partition A to disconnect the physical layer connection. Thus, once the physical layer connection of Partition A has been created, data received at an input port assigned to that physical layer connection continues to be automatically directed to the corresponding output port(s) assigned to that physical layer connection until the user subsequently reconfigures the physical layer switch of Partition A to disconnect the physical layer connection. The physical layer switch of Partition A can thus function as an electronic patch panel for reconfiguring network connections.

As previously mentioned, selected ports of the VSAN switch may be shared by selected partitions of the VSAN switch. For example, if the predetermined output port of the port of the physical layer connection of Partition A, and an input port of the multi-layer connection of the Partition B, is a shared port shared by the physical layer connection of Partition A and the multi-layer connection of Partition B, data may be routed first through the physical layer switch of Partition A and then through the multi-layer switch of Partition B. Thus, data bits of data packets forwarded through the physical layer connection of Partition A, may be forwarded to the predetermined output port of the physical layer connection of Partition A. At the predetermined output port of the physical layer connection of Partition A, the data bits are received at the shared input port of the multi-layer connection Partition B for transmission as data packets through the multi-layer switch of Partition B.

Similarly, if the predetermined input port of the port of the physical layer connection of Partition A is shared with an output port of the multi-layer connection of Partition B, data bits of data packets received from the shared output port of the multi-layer connection of Partition B may be forwarded as data bits through the physical layer connection of Partition A.

The input and output ports 220a, 220b . . . 220n and 224a, 224b . . . 224n of the VSAN switch 210 shared by selected partitions of the VSAN switch 210 may be external ports accessible by external devices such as the device adapters, host adapters, and server. The input and output ports 220a, 220b . . . 220n and 224a, 224b . . . 224n of the VSAN switch 210 shared by selected partitions of the VSAN switch 210 may further include internal ports to facilitate sharing by the partitions of the VSAN switch.

As set forth above, when Partition A was initially created, it was configured as a physical layer switch. In another aspect, should circumstances change, the Partition A may be reconfigured to another type of switch. For example, the partition A may be reconfigured from a physical layer switch which provides a physical layer connection conforming to the physical layer protocol of the communication protocol, to a multi-layer switch having a multi-layer connection which includes a network layer conforming to the network layer protocol of the communication protocol in a manner similar to that of Partition B.

Similarly, when Partition B was initially created, it was configured as a multi-layer switch as discussed above. In another aspect of the present description, should circumstances change, the Partition B may similarly be reconfigured to another type of switch. For example, the partition B may be reconfigured from a multi-layer switch having a multi-layer connection which includes a network layer conforming to the network layer of the communication protocol, to a physical layer switch having a physical layer connection conforming to the physical layer protocol of the communication protocol in a manner similar to that of Partition A when originally configured.

In yet another aspect of the present description, a partition, such as Partition C, for example, may be created and configured (or reconfigured) to perform a "debug" function as well as a physical layer switch function. Thus, in addition to automatically directing data received at an input port assigned to the physical layer connection, to the corresponding output port(s) assigned to that physical layer connection, the Partition C can also collect and analyze data on the forwarding of data bits though the physical layer circuit connection of the Partition C to detect errors.

In a similar manner, a partition, such as Partition D, for example, may be created and configured (or reconfigured) to perform a "debug" function as well as a multi-layer switch function. Thus, in addition to forwarding data packets received at one of the input ports of the multi-layer connection of the Partition D, to one of the output ports of the multi-layer connection of Partition D, as determined by a destination address within each data packet, the Partition D can also collect and analyze data on the forwarding of data packets though the multi-layer connection of the Partition D to detect errors.

A partition such as Partition C, D configured to perform a Debug function can replicate traffic passing through a selected connection of the switch of the partition and perform analysis on the replicated traffic to detect errors or otherwise perform a management function. Also, the replicated traffic may be delivered to a port assigned to the partition for analysis elsewhere within the storage area network 200 or in processors outside the storage area network. It is appreciated that other data capture, analysis or captured data delivery functions may be performed by a debug function configured in a partition in accordance with the present description.

As partitions are created, the user may be presented with options during such partition creation in a VSAN in accordance with the present description, that would allow the user to include, or exclude, functions they require or do not need. For example, one partition could be entirely dedicated to standard multi-layer switch features. Another partition could contain both physical layer switches in accordance with the relevant physical layer protocol, as well as SAN debugging software. A third partition could provide the user with all functionality, allowing the user to choose what is used when needed. Functionality could be applied to a select group of physical ports, or to all ports on the switch.

In one embodiment, to implement the particular types of switches and debug functions, particular algorithms may be provided for functions that are to be included on the partition. It is believed that such flexibility may significantly reduce the amount of physical hardware utilized in a datacenter, and may significantly increase the ease with which administrators manage their SANs. For example, switch functions added to a partition at creation may in turn be eliminated and then added back a feature at a time, step by step, to assist with problem identification.

It is appreciated that a VSAN switch in accordance with the present description may take a variety of physical forms. For example, the VSAN switch 210 may be embodied in a single chassis device with VSAN capabilities, allowing the user to create multiple partitions on the device, dedicated to appropriate functionality.

In another embodiment, the VSAN switch 210 may be embodied in a blade with VSAN capabilities, which could be inserted in a larger device, allowing the user to create multiple partitions on the blade, dedicated to appropriate functionality. In yet another embodiment, the VSAN switch 210 may be embodied in a single chassis device with VSAN capabilities, but where only one partition can be created, dedicated to appropriate functionality.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, interconnected storage devices, an array of storage devices, multiple memory or storage devices or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In certain embodiments, the system of FIG. 2 may be implemented as a cloud component part in a cloud computing environment. In the cloud computing environment, the systems architecture of the hardware and software components involved in the delivery of cloud computing may comprise a plurality of cloud components communicating with each other over a network, such as the Internet. For example, in certain embodiments, the system of FIG. 2 may provide clients, and other servers and software and/or hardware components in the networked cloud, with scheduling services.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIG. 3 shows certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for use with a host and storage, comprising:
   operations by a storage area network (SAN) having a communication protocol, a cluster of servers, a plurality of input/output adapters including a host adapter coupled to the host and a plurality of device adapters coupled to the storage, and a virtual storage area network (VSAN) switch coupling the servers to the input/output adapters, the operations including:
   creating in a first partition of the VSAN switch, a first connection between a predetermined input port of a plurality of input ports and a predetermined output port of a plurality of output ports of the VSAN switch, wherein the first connection is a multi-layer connection which includes a network layer connection conforming to the network layer of the communication protocol;
   creating in a second partition of the VSAN switch, a second connection between a predetermined input port of the plurality of input ports, and a predetermined output port of the plurality of output ports of the VSAN switch, wherein the second connection is a destination address independent physical layer connection conforming to the physical layer of the communication protocol;
   forwarding through the multi-layer connection of the first partition in accordance with the network layer of the communication protocol, data packets received at the predetermined input port of the multi-layer connection of the first partition, to the predetermined output port of the multi-layer connection of the first partition, as determined by a destination address within each data packet; and
   forwarding in accordance with the physical layer of the communication protocol, data bits of data packets received at the predetermined input port of the physical layer connection of the second partition, to the predetermined output port of the physical layer connection of the second partition, independently of any destination address within each data packet.

2. The method of claim 1 wherein the predetermined output port of the physical layer connection of the second partition, and an input port of the multi-layer connection of the first partition, is a shared port shared by the physical layer connection of the second partition and the multi-layer connection of the first partition, so that data bits of data packets forwarded through the physical layer connection of the second partition, to the predetermined output port of the physical layer connection of the second partition, are received at the input port of the multi-layer connection of the first partition, which is shared with the predetermined output port of the physical layer connection of the second partition.

3. The method of claim 1 wherein the predetermined input port of the physical layer connection of the second partition, and an output port of the multi-layer connection of the first partition, is a shared port shared by the physical layer connection of the second partition and the multi-layer connection of the first partition, so that data bits of data packets forwarded through the physical layer connection of the second partition, to the predetermined output port of the physical layer connection of the second partition, are received from an output port of the multi-layer connection of the first partition, which is shared with the predetermined input port of the physical layer connection of the second partition.

4. The method of claim 1, wherein the operations of the SAN further comprise reconfiguring the second partition of the VSAN switch from a physical layer connection conforming to the physical layer protocol of the communication protocol, to a multi-layer connection which includes a network layer conforming to the network layer protocol of the communication protocol.

5. The method of claim 1, wherein the operations of the SAN further comprise reconfiguring the first partition of the VSAN switch from a multi-layer connection which includes a network layer conforming to the network layer of the communication protocol, to a physical layer connection conforming to the physical layer protocol of the communication protocol.

6. The method of claim 1, wherein the operations of the SAN further comprise creating in the second partition of the VSAN switch, a debug monitor to collect and analyze data on the forwarding of data bits though the physical layer connection of the first partition to detect errors.

7. The method of claim 1, wherein the operations of the SAN further comprise creating in the first partition of the VSAN switch a debug monitor to collect and analyze data on the forwarding of data packets though the multi-layer connection of the first partition to detect errors.

8. A computer program product for use with a host and storage, the computer program product comprising a computer readable storage medium having computer readable program code embodied therein that executes to perform operations, the operations being in a storage area network (SAN) having a communication protocol, a cluster of servers, a plurality of input/output adapters including a host adapter coupled to the host and a plurality of device adapters coupled to the storage, and a virtual storage area network (VSAN) switch coupling the servers to the input/output adapters, the operations comprising:
   creating in a first partition of the VSAN switch, a first connection between a predetermined input port of a plurality of input ports and a predetermined output port of a plurality of output ports of the VSAN switch, wherein the first connection is a multi-layer connection which includes a network layer connection conforming to the network layer of the communication protocol;
   creating in a second partition of the VSAN switch, a second connection between a predetermined input port of the plurality of input ports and a predetermined output port of the VSAN switch, wherein the second connection is a destination address independent physical layer connection conforming to the physical layer of the communication protocol;
   forwarding through the multi-layer connection of the first partition in accordance with the network layer of the communication protocol, data packets received at the predetermined input port of the multi-layer connection of the first partition, to the predetermined output port of the multi-layer connection of the first partition, as determined by a destination address within each data packet; and
   forwarding in accordance with the physical layer of the communication protocol, data bits of data packets received at the predetermined input port of the physical layer connection of the second partition, to the predetermined output port of the physical layer connection of the second partition, independently of any destination address within each data packet.

9. The computer program product of claim 8 wherein the predetermined output port of the physical layer connection of the second partition, and an input port of the multi-layer connection of the first partition, is a shared port shared by the physical layer connection of the second partition and the multi-layer connection of the first partition, so that data bits of data packets forwarded through the physical layer connection of the second partition, to the predetermined output port of the physical layer connection of the second partition, are received at the input port of the multi-layer connection of the first partition, which is shared with the predetermined output port of the physical layer connection of the second partition.

10. The computer program product of claim 8 wherein the predetermined input port of the physical layer connection of the second partition, and an output port of the multi-layer connection of the first partition, is a shared port shared by the physical layer connection of the second partition and the multi-layer connection of the first partition, so that data bits of data packets forwarded through the physical layer connection of the second partition, to the predetermined output port of the physical layer connection of the second partition, are received from an output port of the multi-layer connection of the first partition, which is shared with the predetermined input port of the physical layer connection of the second partition.

11. The computer program product of claim 8, wherein the operations further comprise reconfiguring the second partition of the VSAN switch from a physical layer connection conforming to the physical layer protocol of the communication protocol, to a multi-layer connection which includes a network layer conforming to the network layer protocol of the communication protocol.

12. The computer program product of claim 8, wherein the operations further comprise reconfiguring the first partition of the VSAN switch from a multi-layer connection which includes a network layer conforming to the network layer of the communication protocol, to a physical layer connection conforming to the physical layer protocol of the communication protocol.

13. The computer program product of claim 8, wherein the operations further comprise creating in the second partition of the VSAN switch, a debug monitor to collect and analyze data on the forwarding of data bits though the physical layer connection of the first partition to detect errors.

14. The computer program product of claim 8, wherein the operations further comprise creating in the first partition of the VSAN switch a debug monitor to collect and analyze data on the forwarding of data packets though the multi-layer connection of the first partition to detect errors.

15. A system for use with a host, storage and a storage area network (SAN) having a communication protocol, comprising:
a virtual storage area network (VSAN) switch having a plurality of input ports, a plurality of output ports, a processor and a computer readable storage medium including code executed by the processor to perform operations, the operations comprising:
creating in a first partition of the VSAN switch, a first connection between a predetermined input port of the plurality of input ports, and a predetermined output port of the plurality of output ports of the VSAN switch, wherein the first connection is a multi-layer connection which includes a network layer connection conforming to the network layer of the communication protocol;
creating in a second partition of the VSAN switch, a second connection between a predetermined input port and a predetermined output port of the VSAN switch, wherein the second connection is a destination address independent physical layer connection conforming to the physical layer of the communication protocol;
forwarding through the multi-layer connection of the first partition in accordance with the network layer of the communication protocol, data packets received at the predetermined input port of the multi-layer connection of the first partition, to the predetermined output port of the multi-layer connection of the first partition, as determined by a destination address within each data packet; and
forwarding in accordance with the physical layer of the communication protocol, data bits of data packets received at the predetermined input port of the physical layer connection of the second partition, to the predetermined output port of the physical layer connection of the second partition, independently of any destination address within each data packet.

16. The system of claim 15 wherein the predetermined output port of the physical layer connection of the second partition, and an input port of the multi-layer connection of the first partition, is a shared port shared by the physical layer connection of the second partition and the multi-layer connection of the first partition, so that data bits of data packets forwarded through the physical layer connection of the second partition, to the predetermined output port of the physical layer connection of the second partition, are received at the input port of the multi-layer connection of the first partition, which is shared with the predetermined output port of the physical layer connection of the second partition.

17. The system of claim 15 wherein the predetermined input port of the physical layer connection of the second partition, and an output port of the multi-layer connection of the first partition, is a shared port shared by the physical layer connection of the second partition and the multi-layer connection of the first partition, so that data bits of data packets forwarded through the physical layer connection of the second partition, to the predetermined output port of the physical layer connection of the second partition, are received from an output port of the multi-layer connection of the first partition, which is shared with the predetermined input port of the physical layer connection of the second partition.

18. The system of claim 15, wherein the operations further comprise reconfiguring the second partition of the VSAN switch from a physical layer connection conforming to the physical layer protocol of the communication protocol, to a multi-layer connection which includes a network layer conforming to the network layer protocol of the communication protocol.

19. The system of claim 15, wherein the operations further comprise reconfiguring the first partition of the VSAN switch from a multi-layer connection which includes a network layer conforming to the network layer of the communication protocol, to a physical layer connection conforming to the physical layer protocol of the communication protocol.

20. The system of claim 15, wherein the operations further comprise creating in the second partition of the VSAN switch, a debug monitor to collect and analyze data on the forwarding of data bits though the physical layer connection of the first partition to detect errors.

21. The system of claim 15, wherein the operations further comprise creating in the first partition of the VSAN switch a debug monitor to collect and analyze data on the forwarding of data packets though the multi-layer connection of the first partition to detect errors.

* * * * *